(12) United States Patent
Kalbag et al.

(10) Patent No.: US 7,366,136 B1
(45) Date of Patent: Apr. 29, 2008

(54) DETERMINING CHARGEABLE DURATION AT THE HOME AGENT FOR A PREPAID MIP SESSION

(75) Inventors: Rohit S. Kalbag, Bridgewater, NJ (US); Robert Ephraim, Bridgewater, NJ (US); Ben Chen, Northboro, MA (US)

(73) Assignee: Cellco Partnership, Bedminster, NJ (US)

( * ) Notice: Subject to any disclaimer, the term of this patent is extended or adjusted under 35 U.S.C. 154(b) by 381 days.

(21) Appl. No.: 11/138,343

(22) Filed: May 27, 2005

(51) Int. Cl.
*H04Q 7/00* (2006.01)
(52) U.S. Cl. .................. 370/329; 370/345; 455/450; 455/406
(58) Field of Classification Search ................ 370/329, 370/328, 330, 345; 455/450, 406
See application file for complete search history.

(56) References Cited

U.S. PATENT DOCUMENTS

| | | | |
|---|---|---|---|
| 5,359,182 | A | 10/1994 | Schilling |
| 5,826,185 | A | 10/1998 | Wise et al. |
| 6,029,062 | A | 2/2000 | Hanson |
| 6,036,090 | A | 3/2000 | Rahman et al. |
| 6,058,300 | A | 5/2000 | Hanson |
| 6,149,353 | A | 11/2000 | Nilsson |
| 6,185,198 | B1 | 2/2001 | LaDue |
| 6,185,414 | B1 | 2/2001 | Brunner et al. |
| 6,236,851 | B1 | 5/2001 | Fougnies et al. |
| 6,298,250 | B1 | 10/2001 | Nilsson |
| 6,330,443 | B1 | 12/2001 | Kirby |
| 6,434,378 | B1 | 8/2002 | Fougnies |
| 6,453,158 | B2 | 9/2002 | Donovan et al. |
| 6,473,610 | B1 | 10/2002 | Nilsson |
| 6,487,401 | B2 | 11/2002 | Suryanarayana et al. |
| 6,496,690 | B1 | 12/2002 | Cobo et al. |
| 6,741,687 | B1 | 5/2004 | Coppage |
| 6,829,473 | B2 | 12/2004 | Raman et al. |

(Continued)

OTHER PUBLICATIONS

U.S. Appl. No. 10/247,034 to Clare et al., filed Sep. 19, 2002.

(Continued)

*Primary Examiner*—Nghi H. Ly
(74) *Attorney, Agent, or Firm*—McDermott Will & Emery LLP (57) ABSTRACT

Duration based accounting for a packet data service, for example offered as a prepaid mobile IP (MIP) service through a public mobile wireless communication network, uses last detected user activity to determine the end of each session for accounting purposes. The accounting policy or algorithm defines user activity so as to include receipt of signaling related to the MIP session, such as signaling related to a termination by the user or the user's mobile station, in addition to packet data routed for the mobile station. If a session ends due to a network termination, e.g. binding expires or the network disconnects upon prepaid quota exhaustion, then the last user activity used for accounting purposes is the last data packet communication to/from the mobile station or the last received MIP session-related signaling message. For example, if MIP signaling terminates the session, then the session duration runs until receipt of that signaling.

14 Claims, 5 Drawing Sheets

U.S. PATENT DOCUMENTS

| | | | |
|---|---|---|---|
| 2002/0102962 A1* | 8/2002 | Grinn et al. | 455/406 |
| 2004/0009761 A1 | 1/2004 | Money et al. | |
| 2004/0028055 A1 | 2/2004 | Madour et al. | |
| 2004/0106393 A1* | 6/2004 | Chowdhury et al. | 455/406 |
| 2004/0148384 A1 | 7/2004 | Ramakrishnan et al. | |
| 2004/0156340 A1 | 8/2004 | Madour | |
| 2004/0196826 A1 | 10/2004 | Bao et al. | |
| 2004/0205212 A1 | 10/2004 | Huotari et al. | |

OTHER PUBLICATIONS

U.S. Appl. No. 10/133,232 to Tang et al., filed Apr. 26, 2002.

Brochure No. SurePay May 2002; "MiLife™ SurePay® Solutions Suite"; Lucent Technologies Bell Labs Innovations; c. 2002; Lucent Technologies; United Kingdom.

"cdma2000 Wireless IP Network Standard: PrePaid Packet Data Service" 3rd Generation Partnership Project 2 "3GPP2" 3GPP2 X.S0011-006-C, Aug. 2003, 35 pages.

"cdma2000 Wireless IP Network Standard: Accounting Services and 3GPP2 RADIUS VSAs" 3rd Generation Partnership Project 2 "3GPP2" 3GPP2 X.S0011-005-C, Aug. 2003, 48 pages.

Chiba, M. et al. "Dynamic Authorization Extensions to Remote Authentication Dial In User Service (RADIUS)", Microsoft Corporation, Jul. 2003, © The Internet Society p. 1-30.

Perkins, C. ed. "IP Mobility Support for IPv4" Nokia Research Center, Jan. 2002, © The Internet Society, p. 1-98.

Glass, S. "Registration Revocation in Mobile IPv4" Cisco Systems, Aug. 2003, © The Internet Society, p. 1-33.

\* cited by examiner

DETERMINING CHARGEABLE DURATION AT THE HOME AGENT FOR A PREPAID MIP SESSION

TECHNICAL FIELD

The present teachings relate to techniques, network equipment and software to provide duration based accounting for packet data services offered via a public mobile wireless communication network, where the session may be terminated due to a number of different types of events that result in different measures of session duration.

BACKGROUND

In recent years, mobile wireless communications have become increasingly popular. Initial implementations of mobile wireless communications, for example in the form of cellular telephone networks, supported circuit switched voice communication services. Today wireless carriers also offer packet data communication services to their mobile customers.

Prepaid communications services, in which a customer or subscriber prepays for usage of a communications system, have become increasingly popular. Such services now encompass an array of mobile wireless communications. In an example of a prepaid wireless service, the customer may purchase blocks of time for making voice telephone calls via a cellular telephone network. Upon connecting to the wireless communications network, the customer account is authorized and authenticated, and the network allows a call to proceed. The network monitors the customer's usage time and decrements from the customer's account. If the account becomes depleted, the system can either prompt the customer to purchase more time, or the system can terminate the call. Prepaid wireless communications system enable the customer to budget an amount of airtime that will be used during a certain period of time, and to insure that the budget will not be exceeded unless the customer purchases more airtime. The wireless service provider likes this type of service, because the carrier receives payment in advance and need not run the risk that the customer will default on a bill, as sometimes happens with postpay type billing services.

Service providers have extended their prepaid offerings to encompass various wireless data services. For example, commonly assigned U.S. patent application Ser. No. 10/247,034 to Varsha Clare et al. discloses a "Method and System for Processing Prepaid Wireless Data Communications." As disclosed there, a receiving node, such as a packet data serving node (PDSN), handles packet data calls and interacts with an administration system, including an authentication, authorization and accounting (AAA) server and a prepaid server platform. Upon receiving a packet data call, the PDSN accesses the AAA server to obtain call access authorization. For a prepaid customer, with the authorization, the PDSN also receives a prepaid volume record indicating an amount of prepaid units available for use by the customer and processing instructions, from the server platform for the prepaid service. The PDSN then enables the wireless data call to proceed on the network, while monitoring the call and decrementing the available prepaid units from the prepaid volume record associated with the customer. If the available prepaid units reach a predetermined level, as indicated in the processing instructions, the PDSN notifies the prepaid service server that the predetermined level has been reached. The server system can respond either with an updated available balance, which enables the PDSN to allow the call to continue, or with instructions to the PDSN to terminate the call.

As another example, US published patent application no. 2004/0106393 relates to "Methods, systems and program products for supporting prepaid service within a communication network," specifically for a prepaid packet data communication service. A prepaid client, for example in a foreign agent (FA) PDSN or in a home agent (HA), sends a resource request for prepaid resources through the network to a prepaid server. In response, the prepaid server transmits a resource response that specifies a quota of prepaid resources. The quota is no greater than the prepaid account balance of the subscriber. The resource response also includes a resource usage threshold at which the prepaid client will provide notification and will update the account to reflect a portion of the prepaid account balance that has been consumed.

Hence, a modern prepaid packet data (PPD) service allows the subscriber to pay for packet data service prior to usage. In an actual deployment, when a subscriber establishes a prepaid account with the wireless service provider, for packet data service, appropriate provisioning is made at the carrier's Authentication, Authorization and Accounting (AAA) and prepaid server platforms, to allow the subscriber to receive prepaid data service. The AAA server acts as a proxy for the prepaid user's Remote Authentication Dial-User Service (RADIUS) messages, except for accounting messages. The AAA server proxies the RADIUS messages to the provisioned prepaid service platform.

The Packet Data Serving Node (PDSN) and the Home Agent (HA) act as TIA-835-C prepaid clients. TIA-835-C is a standard for by 3GPP2 for a cdma2000 Wireless IP Network. In relevant part, that standard specifies a prepaid packet data service. The prepaid service platform acts as a TIA-835-C prepaid server (PPS). When the subscriber initiates a prepaid call, the AAA server proxies the RADIUS Access-Request to the prepaid service platform. The prepaid service platform checks the subscriber's balance, and prepaid and session termination capabilities of the serving PDSN and the customer's HA, and grants either the PDSN for SIP sessions or the PDSN or the HA for MIP sessions prepaid client (PPC) duties by providing a quota to the node serving as the PPC for the particular call.

The PPC carries out quota replenishment after threshold expiry using RADIUS online Access-Requests, which contain the amount of duration/volume used for that session. The PPC will release resources when the quota is not replenished and runs out, essentially ending the data session. When the subscriber ends a packet data session or the PPC is remotely instructed to tear down the session (by the prepaid platform), the PPC sends the information regarding the duration/volume used during the session, via the AAA server, to the prepaid platform.

The deployment using this standard-based technology supports Mobile IP (MIP). With the MIP service, the assigned IP address does not change as the mobile station changes its point of attachment to the network (e.g. by roaming across a PDSN service boundary). Although the address may be dynamically assigned at log-in, the IP address remains assigned to the particular mobile station until that station logs-off, is inactive for longer than some set period, or the data session is otherwise terminated. MIP provides routing of packets between PDSNs, to effectively enable roaming between service areas of different PDSNs.

However, problems arise in determining the duration of a communication session for prepaid accounting treatment, when the service uses MIP and the HA acts as the PPC. Many different events may cause termination of a MIP session at the HA and cause the HA to remove the MIP binding associated with the user. Some of the common scenarios that may cause a MIP session for a particular user to end at the HA include:

1. The mobile device deregisters by sending a MIP registration with a lifetime value of zero;
2. The HA MIP binding for the user expires because the mobile device failed to send a new MIP registration request within the lifetime;
3. A MIP Registration Revocation for the user was received by the HA;
4. The HA receives a RADIUS Disconnect Request message due to resource management; and
5. For prepaid users, the MIP session may be discontinued by the HA in the event that there are no more funds available.

Prepaid accounting, for at least some data sessions, is based on duration of the session or logical data connection. Many customers prefer duration based accounting because it is far easier to understand than accounting based on number of packets or bytes of data. The different types of MIP session termination, however, cause sessions to end at different times (upon occurrence of different events), that the existing systems have not recognized. TIA-835-C is a 3GPP2 standard that specifies the PrePaid Packet Data Service for the cdma2000 Wireless IP Network. While the standard allows the Home Agent to charge based on time for a MIP session, it does not explicitly define the end time for various circumstances. As a result, the accuracy of duration-based accounting varies depending on the type of termination.

Hence, a need exists for a technique and equipment to provide prepaid accounting for packet data communication sessions, which can provide accurate accounting for duration including for sessions that terminate due to different events, e.g. to facilitate accurate duration based accounting for MIP sessions terminated in different ways.

SUMMARY

The teachings herein provide a mechanism for duration based accounting for a packet data service, for example offered as a prepaid mobile IP (MIP) service through a public mobile wireless communication network, which uses last detected user activity to determine the end of each session for accounting purposes.

Hence, technology disclosed herein provides a method of accounting for use of a packet data communication service provided to a mobile station via a wireless communication network. In response to a request for the packet data communication service by the mobile station, a packet data communication session is established for the mobile station, through the wireless communication network. The packet data communication session may be terminated upon detecting one of a number of different events. One type of termination event relates to receipt of a session related signaling message at a network node. The network also may initiate the explicit termination of the session. The method involves measuring duration of usage by the mobile station, for accounting purposes, from the establishment of the session until last detected user activity. The accounting algorithm defines last user activity as including packet data communications for the mobile station through the wireless communication network and receipt of a session related signaling message, for example, including a session related signaling message that may lead to termination of the session. However, the last user activity for duration measurement excludes the network initiated termination.

In the examples, the packet data communication service utilizes MIP, and the duration based accounting relates to the duration of the MIP session. Typically, the duration runs from the assignment of the IP address to the mobile station for the MIP station until the end of the MIP session. The disclosed technology determines the MIP chargeable duration based on last user activity upon end of the MIP session. In the examples, this last activity is a last user activity, where the activity may be signaling related to the MIP session, such as signaling related to a termination by the user or the user's mobile station, or packet data routed to/from the mobile station. If a session ends due to a network termination, e.g. the MIP address binding expires or the network disconnects upon exhaustion of the prepaid quota, then the last user activity used for duration accounting purposes is the last data packet communication to/from the mobile station or the last prior MIP session-related signaling message. If MIP signaling terminates the session, then the session duration runs until receipt of that signaling.

Hence, the disclosed technology also facilitates a method of providing a prepaid packet data communication service, which involves receiving a mobile internet protocol (MIP) request message, relating to a request for the packet data communication service by the mobile station, and establishing a MIP packet data communication session for the mobile station through the wireless communication network. Establishment of the MIP session includes assigning an Internet Protocol (IP) address, for use by the mobile station during the MIP session. Measurement of duration of the session begins upon the establishment of the MIP session; and the service entails routing packets of data containing the assigned IP address to or from the mobile station via the established MIP session. If the MIP session is terminated as a result of receipt of a MIP signaling message, time of receipt the MIP signaling message that resulted in termination is used as an ending of the measured duration. However, if the network initiated termination, a different end time is used. In this second situation, the end time will be the later of: the last routed packet of data for the mobile station and the last preceding MIP signaling message that did not result in termination of the MIP session. The method also entails reporting the measured duration, to enable reducing of a prepaid account balance purchased for the mobile station, based on the measured duration.

In addition to method implementations, the techniques summarized above may be implemented in hardware for use in one or more elements of the wireless communication network or in software for programming one or more such elements to implement the relevant methodology.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various networks, network equipment, software products and communication processing techniques disclosed herein relate to duration-based accounting for packet data communications with fair measurement of duration for different types of session termination. In the context of a mobile IP (MIP) type service, the duration of a session ends upon the last user activity. User activity is defined to include signaling related to the MIP session, such as signaling related to a termination by the user or the user's mobile station. However, where a session ends due to a network termination, e.g. binding expires or the network disconnects upon exhaustion of the prepaid quota, then the last user activity used for accounting purposes is the last data packet communication to/from the mobile station or the last MIP session-related signaling message. Although the present concepts are applicable to post-pay billing for packet data communications services through a wireless network, the examples discussed in detail below focus of application to prepaid services.

Figure 1:
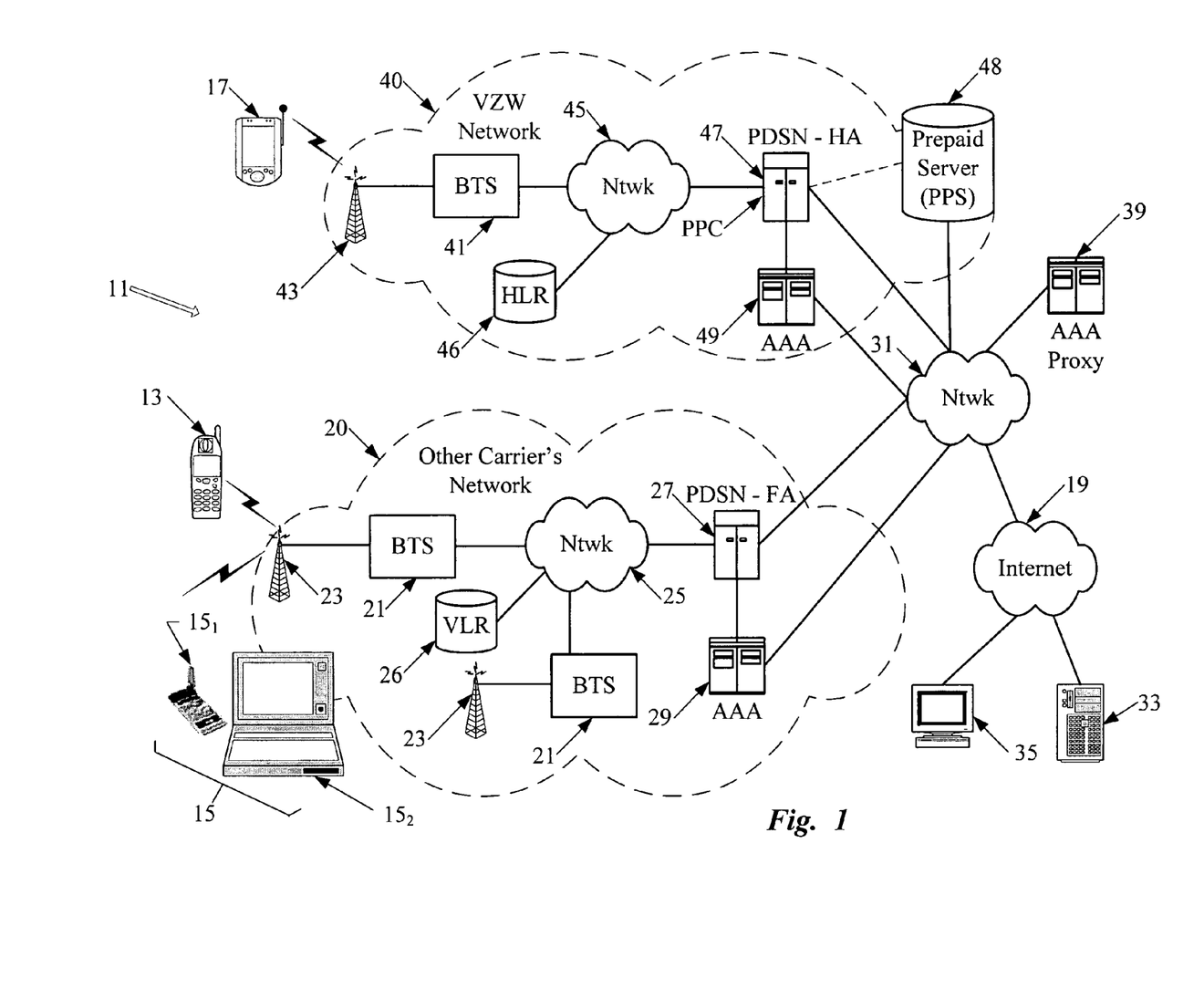
FIG. 1 is a simplified functional block diagram of mobile wireless communication networks offering various voice and data services, many of which can be offered on a prepaid basis.

The present teachings may be implemented in a variety of network architectures that offer wireless packet data communication services and prepayment billing options. However, to insure a full understanding and appreciation of the present teachings, it may be helpful to consider an example of one such network architecture. FIG. 1 is a functional block diagram of an exemplary system 11 of wireless networks for providing mobile voice telephone services and high speed data services. The present concepts are applicable to a variety of different wireless technologies supporting packet data communications services, such as WiFi, WLAN, 1xRTT, GSM/GPRS, UMTS and EVDO. For purposes of discussion only, FIG. 1 represents an EVDO type network or a 1xRTT type system.

The communication networks implementing system 11 provide mobile voice telephone communications as well as packet data services, for numerous mobile stations. For purposes of later discussion three mobile stations 13, 15 and 17 appear in the drawing, to represent examples of several different types of the mobile stations that may receive different packet data services via the system 11. The station 13, for example, may take the form of a mobile telephone station, enhanced with display and user input capabilities to support certain text and image communications, such as email, picture communication and web browsing applications. Today, such mobile telephones typically take the form portable handsets, although they may be implemented in other form factors.

The station 15 is a portable computing device, specifically, comprising a wireless modem card $15_1$ inserted into a handheld or laptop personal computer (PC) $15_2$ or the like. Although shown as a separate card, the modem $15_1$ may be integrated into the PC $15_2$. Alternatively, the PC $15_2$ may connect to a handset device, similar to the handset type mobile station 13. The station 17 takes the form of a personal digital assistant (PDA) or BlackBerry type device incorporating a wireless transceiver compatible with the particular type of packet data service offered by the system 11. Of course, the mobile stations with packet data communication capabilities may take other forms or connect to a variety of other data devices that may enable use of the network communication services.

The system 11 may allow users of the mobile stations to initiate and receive telephone calls to each other as well as through the public switched telephone network (not shown). For purposes of this discussion, the system 11 enables any and all users of the mobile stations 13, 15 and 17 to initiate and receive various packet switched data communications, for example to or from the public data network 19 referred to as the Internet. Some of the users of the mobile stations will subscribe to voice and/or data services under one or more postpay service plans offered by a carrier or service provider. However, the users or subscribers of other stations will subscribe to voice and/or data services under a prepaid plan, in which they pay in advance for an amount of communication service usage. In the examples, usage is measured by duration, e.g. length of time of a circuit switched voice call or length of time of a data communication session.

The packet data services through the system 11 may allow communications with other networks such as private intranets (not shown). The packet data communications allow users of the mobile stations to send to or receive data from other digital devices that otherwise have access to the Internet 19, such as servers 33, hosts and personal computers 35 coupled to the Internet 19, as well as to or from other mobile stations.

The system 11 provides the various wireless communication services in accord with at least one digital radio protocol although for voice telephone services, the network may also support one or more legacy analog or digital protocols. The illustrated system 11 supports a variety of multimedia voice and data services, using digital packet communications over the air link. In an EVDO implementation, supported services include Voice over IP (VoIP) type telephone communications, as well as high-speed web browsing, just to name two exemplary services. In a 1xRTT implementation, the system would carry voice communications as separate circuit switched communications, although those communications also typically utilize a digital communication protocol.

The system 11 may comprise access networks operated by a large number of separate and independent service providers or "carriers." For discussion purposes, the drawing shows two such radio access networks (RANs) 40 and 20, which we will assume are operated by two different carriers (VZW and another carrier), although those skilled in the art will recognize that large carriers operate a number of such networks and that many countries have more than two mobile carriers that offer or soon will offer packet data communication services. Through the carriers' access networks 20 and 40, the overall system 11 offers mobile communications to customers using mobile stations throughout a wide geographic area.

Physical elements of a radio access network (RAN) 20, operated by one of the other carriers, include a number of base stations represented in the example by the base transceiver systems (BTS) 21, each of which communicates via an antennae system at the site of base station 23 and the air-link with one or more of the mobile stations 13, 15 and 17, when the mobile stations are within range. Each base station typically includes a BTS 21 coupled to several antennae mounted on a radio tower within a coverage area often referred to as a "cell." The BTS 21 is the part of the radio network that sends and receives RF signals to/from the mobile stations that the base station currently serves.

The network 20 also includes a traffic network 25, which carries the user communications for the mobile stations 13, 15 and 17. In a 1xRTT implementation, the network 25 includes a number of radio access network switches, typically modern versions of mobile switching centers (MSCs) or Mobile Telephone Switching Offices (MTSOs), which support both cellular voice and packet data services. Each such switch connects through trunk circuits (not shown) to a number of the BTS base station transceivers 21, which the respective switch serves and controls. In an EVDO (evolution data only) implementation, the network 25 is a high-speed packet switched data network comprising a number of packet switches/routers connected to the BTS base station transceivers 21.

The BTS 21 at a base station assigns and reassigns channels to the mobile stations 13, 15 and 17 that it serves and monitors the signal levels to recommend hand-offs to other base stations. The network 25 typically includes a base station controller (BSC) functionality that controls the functions of a number of base stations and helps to manage how calls made by each mobile station are transferred (or "handed-off") from one serving base station to another. Each wireless network equipment vendor implements this function differently. Some vendors have a physical entity, which they call a BSC, while other vendors include this functionality as part of their switch (not shown).

The network 20 also includes a number of Packet Data Serving Nodes or "PDSNs" 27 coupled to the traffic network 25. The PDSN is a fixed network element introduced in the architectures for 3g wireless networks, to support packet-switched data services. Each PDSN 27 establishes, maintains and terminates logical links to the associated portion of the radio access network 20. The PDSNs also support point-to-point (PPP) sessions with the mobile stations. The PDSNs provide the packet routing function from the radio network to/from other packet switched networks, represented generally by the private network 31 of the carriers and the Internet 19, in the drawing.

The PDSN 27 initiates Authentication, Authorization and Accounting (AAA) communications to an AAA server 29, for example, via a secure private packet network (not separately shown), for each mobile station client seeking packet communications. The server 29 provides Authentication, Authorization, and Accounting (AAA) functions for packet data calls in a cdma2000-1x (1xRTT) type network or an EVDO type network, such as the network 20. Such servers authorize service subscriptions, service profiles, and customized services. The AAA server 29 also performs a variety of accounting functions, including starting an accounting record, maintaining an interim accounting record, and stopping an accounting record, for each packet data communication service session in response to various messages from the PDSN(s) processing the data session. The PDSN 27 receives service parameters for the mobile station, operating as a mobile client, from the AAA server 29. The PDSN 27 also collects usage data for accounting purposes, which it relays to the AAA server 29. As will be discussed more later, the PDSN 27 also acts as a prepaid client (PPC) on behalf of the mobile station of a prepaid customer.

In a 1xRTT network implementation, the network 25 utilizes switched digital links through MSC or MTSO types switches, and the network 31 is a separate packet switched data network formed of packet routers/switches and appropriate interconnected packet links. In an EVDO implementation, the network 25 is a packet network, and the link or network to the AAA server 29 may utilize the same routers/switches and links to carry the various packet communications.

Although different radio access networks may utilize different technologies or architectures, for discussion purposes it is assumed that the RAN 40 is generally similar to the RAN 20. Like the network 20, the physical elements of the radio access network (RAN) 40, include a number of base stations represented in the example by the base transceiver system (BTS) 41. Each BTS 41 communicates via an antennae system at the site of base station 43 and the air-link with one or more of the mobile stations, 15 and 17, when the mobile stations are within range. The network 40 also includes a traffic network 45, which carries the user communications for the mobile stations 13, 15 and 17. As in the network 20, the traffic network 45 may utilize modern versions of mobile switching centers (MSCs) or Mobile Telephone Switching Offices (MTSOs), which support both cellular voice and packet data services; or the network 45 may utilize a number of packet switches/routers to provide a high-speed packet switched data network.

The network 40 also includes a number of Packet Data Serving Nodes or "PDSNs" 47 coupled to the traffic network 45. The PDSN 47 performs functions similar to those of the PDSN 27 in the network 20, both to provide packet switched routing services and to perform the validation and billing related functions. The network 40 also includes an Authentication Authorization and Accounting (AAA) server 49, analogous to the server 29. Again, the PDSN also acts as a prepaid client (PPC) on behalf of the mobile station of a prepaid customer.

The illustrated system 11 supports a range of packet data services. The packet data communications can support traditional data applications, such as browsing the Internet 19 and email communications to/from remote computers, represented generally by the server 33 and/or the personal computer (PC) or other workstation device 35. The packet data communications through the network 11 also can support Voice over IP (VoIP) type packet applications. The computer 35 and the server 33 are intended as general examples of classes of devices that may participate in data communications to/from the users' mobile terminal devices 13, 15, 17, both for traditional data communications and for VoIP applications. VoIP applications may also provide transport for audio communications between mobile stations, e.g. for a push-to-talk (PTT) type service.

Different customers subscribe to service through different providers and are assigned to specific radio access networks (RAN's) 20 or 40 as their home networks; and the mobile stations and network elements are provisioned accordingly. Those skilled in the art will understand that the system 11 will provide services for many customers through their mobile stations, although for simplicity, only three mobile stations are illustrated. For discussion purposes, assume that mobile stations 13 and 17 belong to customers of the access provider network 40. For discussion purposes only, the home carrier is referred to as carrier "VZW," therefore the network 40 is the VZW network. The subscribers owning stations 13 and 17 are VZW customers, whereas the subscriber owning station 15 is a customer of the other carrier. Hence, stations 13 and 17 are 'homed' on the network 40. Similarly, the mobile station 15 is homed on the network 20 of the other carrier.

As shown, mobile station 17 is operating within the service area of its home access provider network 40. By contrast, the VZW customer using the mobile 13 has roamed out of the service area of its home access provider network 40 and into a different geographic area, where the mobile station 13 is receiving wireless service from a different access provider network referred to as the "visited" access provider network, in this case, a network 20 operated by the other carrier.

For voice communication services, some implementations (e.g. for 1xRTT) of the wireless network 40 include a Home Location Register (HLR) 46, which stores data regarding the valid station's identification, the assigned telephone number, subscription service options terminal capabilities, etc. The home network 40 uses the service information from the HLR 46 to provide the subscribed services to each user's mobile station, for example, while the station 17 is operating in the service area of the home network. Although the HLR 46 may reside in an MSC or other switch, today, the HLR typically runs as an application/database on a separate computer coupled for packet signaling communication via the SS7 network (not shown). In some networks, the computer or server providing the HLR functionality is referred to as a Service Control Point (SCP). Of course, there may be multiple computers distributed throughout the network for performing the HLR function. In some implementations, the SCP functionality is incorporated into an MSC or into a switch or router of the packet network providing the SS7 signaling communications. Other implementations provide packet communications to and from the element serving as the HLR via IP networking.

As a customer roams, the mobile station 13 registers in service areas other than the home area. To facilitate roaming and attendant registration for voice services, each network also implements a Visitor Location Register (VLR), such as the VLR 26 shown in the roaming other carrier's network 20. VLRs typically reside in the MSCs although the function may be implemented in other network nodes. The VLR 26 and the HLR 46 interact to validate the roaming mobile station 13. For a validated station 13, service information for that station is downloaded from the HLR 46 to the VLR 26 in a visited access network 20 during a successful registration process. The validation process also provides information to the HLR 46 indicating the current location of the station 13, in this case, within the network 20, to allow the home network 40 to route incoming voice calls to the station 13 at its current location.

The AAA servers interact to provide similar validation and location update functions, for packet data communication services. Authentication, Authorization, and Accounting (AAA) servers 29 and 49 are used for Authentication, Authorization and Accounting functions for packet data calls in a 1xRTT or EVDO type system 11. Both access networks 20 and 40 include one or more such servers 29 and 49; and there may be one or more third party trusted AAA servers 39 that serve as proxies for communications between AAA servers of different carriers. As noted, the AAA servers provide authentication for roaming mobile stations that request packet data communications services, such as the station 13. The home server 49 also maintains data derived from the validation process, which provides an up to date indication of the point of attachment of the roaming station 13 to a wireless network, such as to the visited network 20.

In the preferred implementation of the system 11, all authentication, authorization and accounting transactions are performed using the RADIUS (Remote Authentication Dial-User Service) protocol. RADIUS protocol has been in use for many years and is used widely in the ISP (Internet Service Provider) networks. In the network 20, RADIUS is implemented on a client-server model in which the PDSN 27 acts as the client and AAA 29 acts as the server. Similarly, in the network 40, RADIUS is implemented on a client-server model in which the PDSN 47 acts as the client and AAA 49 acts as the server.

During registration of roaming subscribers, it becomes necessary to conduct certain transactions between AAA servers 29 and 49. These communications may be conducted directly via the IP network 31 or the like. In many cases, however, the AAA server 29 or 49 in each respective network 20 or 40 will communicate via the IP network 31 with a secure broker server 39 acting as an AAA proxy server. The IP network 31 could be a public network, such as a portion of the public Internet. However, because of the mission-critical nature of the AAA communications and the security and finance-related issues involved in such communications, the IP network 31 preferably is a secure packet communication network operated by one or more of the carriers or their trusted service providers.

In a typical data session, the AAA functionality also provides user authentication, usually in the form of a challenge and response procedure to obtain and validate a user ID and password. In the visited network 20, the AAA server 29 communicates with the AAA server 49 in the home network (possibly via proxy 39) to validate user ID and password information received from the user of the roaming station 13. Often, the data session may be considered to "start" when the user log-in is successfully completed. The data session "ends" when the user logs off or the session is terminated, e.g. due to interruption of packet communications to/from the mobile station 13.

The network 11 may provide Simple IP (SIP) address assignment, Mobile IP (MIP) address assignment, or both. The prepaid data service(s) in the example, however, will utilize the MIP address assignment technique, and the duration measured for accounting purposes will be that of the MIP session. MIP is a service in which the subscriber is assigned an IP address from a "home" network. With the MIP service, the assigned IP address does not change as the mobile station changes its point of attachment to the network (e.g. by roaming across a PDSN service boundary). If MIP assigned, the IP address remains assigned to the particular mobile station until that station logs-off, is inactive for longer than some set period, or the data session is otherwise terminated. MIP address service enables routing of packets between PDSNs 27 and 47, to effectively enable roaming between service areas of different PDSNs. Start of the session for accounting purposes coincides with MIP assignment of a home IP address to the station, for its use during the session.

With MIP type address and routing functionality, at log-in, the home agent (HA) in the network 40 assigns an address to the station, from the VZW home carrier's pool of addresses, for use during the duration of the session. When a mobile station has roamed across a PDSN boundary, for example when station 13 roams from network 40 to network 20, the mobile station will obtain packet data services via the PDSN 27. As it roams across the boundary, the mobile station must obtain a "care-of-address" (COA) from a local Foreign Agent (FA), and the registration/validation process provides notice of this COA to the station's Home Agent (HA) on the home network 40. Although other control nodes or routers may perform these Agent functions, in the illustrative embodiment, the PDSNs 27 and 47 serve as these Agents.

The COA address allows the PDSN-HA 47 to route incoming packets for the station 13 arriving with the assigned mobile address through the PDSN-FA router 27 and the visited network 20, and hence, to the roaming mobile station 13. Outgoing packet traffic from the mobile station 13 is typically addressed as normal and routed directly from the PDSN 27 to the destination "correspondent node" (CN), from the visited or "foreign" network 20. This combination of routing paths (MS→FA→CN, and CN→HA→FA→MS) is referred to as "triangular routing." An option is for a "reverse tunnel" to be established between the FA and the HA, so that all outgoing traffic from the mobile station 13 appears to originate on its home network 40. During these communications, the PDSN 27, acting as a Foreign Agent (FA) router, forwards various status and usage data to the associated AAA server 29.

As shown by the above discussion of the MIP based service, the HA node maintains a record of the IP address assigned to the mobile station and an association or binding of that IP address to a COA type address. To keep the IP address assignment, the mobile station will periodically re-register, so that information is provided to the HA. Also, as the mobile station roams across PDSN boundaries, it will receive a new COA type address, and the FA PDSN 27 will inform the HA 47, to enable the HA to update the binding of the IP address to the COA.

The HA 47 also implements a timer mechanism, to release addresses that are not being used. The signaling involved in a registration will specify a 'lifetime' for a binding, which is a period or interval that the binding remains valid with respect to the mobile station. If the HA does not receive a new registration request from the mobile station before the lifetime expires, the HA will release the binding effectively terminating the data session for the particular mobile station. The mobile station may end a session, by sending a registration request specifying a zero (0) lifetime for the binding, however, this technique is not widely used in the wireless industry at this time.

The AAA servers perform a variety of accounting functions, including receiving accounting records from the PDSN/HA starting an accounting record maintaining an interim accounting record, and stopping an accounting record for a packet data communication service. For example, based on data from the PDSN 27 and/or the user login and session termination times, the AAA server 29 provides one or more usage reports regarding each data communication session of the roaming mobile station 13 conducted through the other carrier's network 20. The reports for all sessions of all stations 13 homed to the network 40 may go through the network 31 to the AAA server 49 or directly to the VZW carrier's billing system or other processing system.

A carrier, such as VZW, that offers a prepaid service will also operate a prepaid server (PPS) 48, which manages customers' prepaid accounts. An example of a suitable platform for the PPS 48 is the SurePay® from Lucent Technologies, although other similar platforms may be used or generic platforms may be programmed to operate as the PPS 48. For voice telephone calls, the PPS 48 interacts with switches of the networks 25, 45 and/or with nodes providing HLR/VLR functions to provide prepaid accounting and management of the calls, in a manner well known in the art. In advanced systems such as that shown in FIG. 1, the PPS provides a unified prepaid service control for voice calls and for all other types of services offered through the system 11, such as short message service (SMS). For purposes of the present discussion, the PPS platform 48 also manages prepaid functions relating to packet data services.

In the illustrated example, servers such as 29, 39, 48 and 49 are intended to represent a general class of data processing device commonly used to run "server" programming. Each such device typically runs a general server type program and one or more application programs on top of the server programming, to implement the respective functionality. Such a device typically utilizes general purpose computer hardware to perform its respective server processing and to perform the attendant communications via the network(s). Each such server for example includes a data communication interface for packet data communication. The server also includes a central processing unit (CPU), in the form of one or more processors, for executing program instructions. The server platform also includes program storage and data storage for various data files to be processed and/or communicated by the server. The hardware elements operating systems and programming languages of such servers are conventional in nature, and it is presumed that those skilled in the art are adequately familiar therewith.

The prepaid packet data (PPD) service allows the subscriber to pay for packet data service prior to usage. The integration of PPD with the prepaid platform for other services offered by the carrier (VZW) of network 40 provides a more universal prepaid service package that allows dynamic use of prepaid balance for any type of service (voice, packet data, SMS, etc.) regardless of serving network (3G, 802.11, etc.).

When a subscriber establishes an account with the carrier for packet data service, appropriate provisioning is made at the VZW AAA server 49 and in the prepaid server platform 48 to allow the subscriber to receive PPD service. The AAA server 49 acts as a proxy for the prepaid user's RADIUS messages, except accounting messages. The AAA server 49 proxies the RADIUS messages to the provisioned prepaid server platform 48. The AAA server adds relevant information (e.g., MIP attributes) to the received RADIUS messages from prepaid server 48. The serving FA PDSN 27 and the HA 47 act as TIA-835-C prepaid clients (PPCs). The VZW prepaid platform 48 acts as the TIA-835-C prepaid server (PPS).

When the subscriber initiates a PPD call, the AAA server 49 proxies the RADIUS Access-Request to prepaid server 48. The prepaid service platform checks the subscriber's balance, and prepaid and session termination capabilities of the serving PDSN and the customer's HA, and grants a network node prepaid client (PPC) duties by providing a quota to the node serving as the PPC for the particular call. The PPC function are assigned to the serving PDSN 27 or 47 for SIP sessions. Under the standard, the PDSN or the HA may serve as the PPC for MIP sessions. However, in an initial deployment, PPC responsibilities will fall to the HA 47 for MIP sessions.

The assigned PPC carries out quota replenishment after threshold expiry using online Access-Requests, which contain the amount of duration/volume used for that session.

The PPC will release resources when the quota is not replenished and runs out. When the subscriber ends the packet data session or the PPC is remotely (by prepaid server) instructed to tear down the PPP session, the assigned PPC reports the used duration/volume, via AAA, to the prepaid server 48.

In the example, the processing of prepaid packet data communications implements a common policy to accurately determine the duration of packet data communication sessions terminated for a variety of different causes.

The prepaid service platform 48 accounts for at least some types of packet data communication sessions based on duration, e.g. in minutes of use (MOU). TIA-835-C is a 3GPP2 standard that specifies the PrePaid Packet Data Service for the cdma2000 Wireless IP Network. This standard, for example, allows the Home Agent to charge based on time for a MIP session. The common policy determines the duration that should be charged to the customer under various session-end scenarios. The policy is that the duration that needs to be charged is the time from the start of the MIP session at the HA, typically the time that the HA assigns an IP address to the mobile device or otherwise initially establishes a session binding for the mobile station, to the time till 'last user activity.' The policy effectively causes determination of the 'last user activity' for the user in such a fashion that the user is charged for the duration of the MIP session from the start of MIP session to the end of MIP session, in circumstances when the MIP session ends due to valid user initiated circumstances. Under this policy, the user is charged from the start of the MIP session to the time the last data or MIP signaling packet is received, for situations in which the MIP session ends due to circumstances beyond the customer's control.

Hence, with the new accounting policy, duration timing starts when the HA provides a MIP assignment of an IP address to the mobile station, as part of a process for obtaining access for packet data communications through one of the networks 20, 40. The systems track duration of the session, but the session may be considered to end at somewhat different times, depending on the cause of termination.

As mentioned earlier, there are a number of different events that may cause termination of a MIP session. For example a MIP session for a particular user can end at the HA when the mobile device deregisters by sending a MIP registration with a lifetime value of zero. As another example, an HA MIP binding for the user expires, because the mobile device did not send a MIP registration within the lifetime interval. Receipt of a MIP Registration Revocation for the user at the HA may also cause termination of the MIP session. The session also terminates if the HA receives a RADIUS Disconnect Request message due to resource management. For a prepaid user, the MIP session may be discontinued by the HA if there are no more finds available. Several of these termination events are due to user activity, under the common policy, whereas others are not.

When a duration-based prepaid accounting data session ends, the HA reports the time used till 'last user activity' in the final online Access-Request message that the HA sends to the PPS 48.

The 'last user activity' is the same as the end of the MIP session, for those cases where the MIP session is released due to receipt of MIP Registration Revocation or MIP deregister messages, since MIP messages are counted as user activity. MIP messaging and data packets from the user are considered as user activity. For example, receiving a MIP Registration Revocation for a user is considered as MIP user activity and is used to determine the 'last user activity.'

Similarly, MIP deregister, MIP registration request, MIP registration reply and MIP registration revocation messages all constitute user activity under the accounting policy. Hence, when the MIP resources are released due to receipt of MIP Registration Revocation from the PDSN or MIP deregistration from the MS, the session duration will account for time from start of the MIP session to end of the MIP session.

However, terminations caused by network activity, that is to say those that do not involve a user activity or related MIP message signaling to terminate the session, are not user activity. In such cases, the duration of the session ends at the last user communication or MIP message prior to such termination.

For example, assume that a prepaid MIP session starts at 10 a.m. and ends at 11 a.m. and the last user activity (packet data communication) was detected to be at 10:30 a.m. If the MIP session was terminated due to MIP messaging (i.e., Registration Revocation or deregistration, etc.) then the DurationQuota subtype is set to 60 minutes in the online Access-Request that is sent after the session has terminated. Using the same example, however, if the MIP session was terminated due to RADIUS Disconnect-Request, quota expiry, or MIP lifetime expiry, then the system uses the last user activity at 10:30 a.m. as the session end point. In such a case, the DurationQuota subtype is set to 30 minutes in the online Access-Request that is sent after the session has terminated.

To appreciate these operations, it may be helpful to consider a few examples. FIGS. 3 to 7 are timelines of MIP sessions, for example, for a prepaid packet data service, with somewhat different results for different termination events. The prepaid service under consideration here charges for usage based on time duration, typically in minutes of use. In each example, the duration of the session begins with the assignment of the IP address and associated 'binding' performed at the node serving as the home agent (HA) 47. Before discussing the timeline examples, it may be helpful first to consider the signaling to initiate a session and establish binding at the HA.

Figure 2:
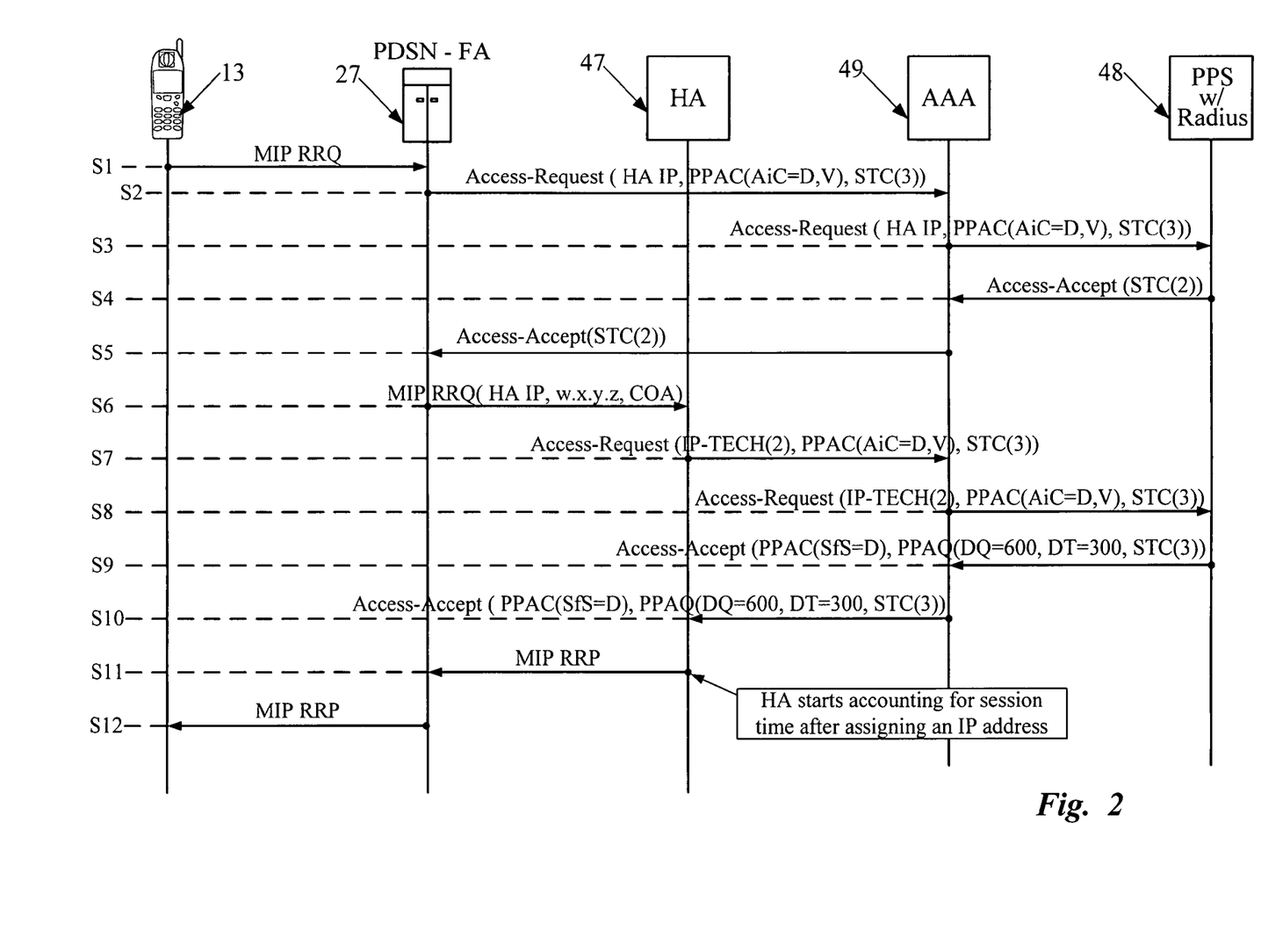
FIG. 2 is a signal flow diagram illustrating messages communicated during initiation of a MIP session for prepaid packet data communication though the network of FIG. 1.

FIG. 2 is a signal flow diagram illustrating a technique for establishment of a MIP prepaid user session with duration based charging. For purposes of the example, assume that the prepaid subscriber is utilizing mobile station/handset 13 within the service area of the network 20. When the user turns on the handset 13 and initiates a data communication, the handset communicates through the air-link and the base station transceiver 21 and through the network 25 with the PDSN 27. A PPP session is set-up between the handset 13 and the PDSN 27. The PDSN 27 and the AAA servers provide a mechanism to authenticate the handset, and may provide a mechanism to authenticate the user, e.g. based on a user identification and password. These aspects of the session are well known and typically implemented in accord with an applicable standard, so further discussion here should be unnecessary as they do not directly impact the MIP session accounting.

With regard to the MIP session, the mobile station 13 initially requests packet data service (at S1), for example by sending an initial mobile IP registration request message (MIP RRQ) to the PDSN/FA 27 in the area in which the station 13 is currently operating. The MIP RRQ message includes various station related information, such as the Network Access Identifier (NAI), the mobile node to AAA authentication extension (MN-AAA), and the mobile node to home agent authentication extension (MN-HA).

The MIP RRQ message includes fields for the station's home IP address and the IP address of the subscriber's assigned home agent (HA). The mobile station populates these message fields with data provisioned in its memory. If requesting a static address service, for example, the static IP address and home agent IP address would be provisioned in memory and used to populate these message fields. However, since the station 13 is requesting a dynamic address assignment type data service, the memory location for the station's own home IP address has not been provisioned with a unique specific value and would contain a standard default value. The HA IP address may also utilize a default value, to allow the AAA to select an HA node for the particular session. For purposes of discussion of the prepaid service examples, however, assume that the station 13 is provisioned with an IP address of a PDSN or other node assigned to function as that station's home agent. Hence, the MIP RRQ message sent in step S1 includes the default IP address, in the station address field; and it includes the pre-provisioned IP address of the assigned HA node 47.

The mobile station 13 transmits the MIP RRQ request message over the air link to a base station 23, which relays the digital data form of that message over hard wired network resources 25 to the PDSN/FA 27. When the PDSN/FA 27 receives the MIP RRQ message, it initiates an Access Request to the home AAA server 49 (at S2). The Access Request sent to the AAA server 49 includes the Home IP address and the HA IP address from the MIP RRQ message, in this case the default value for the station's home IP address indicating a request for assignment of an mobile IP address and the HA IP address of the HA 47.

For a customer subscribing to a post-pay type packet data service, the mobile station would be "homed" to the AAA server 49, and that server would provide the data needed to authenticate the station (and possibly the user). In such a case, the AAA server 49 checks it database to authenticate and validate the subscriber and the station 13 based on the data in the Access Request message.

For a prepaid customer, however, the AAA server 49 acts as a proxy, with regard to authentication functions provided by the prepaid service platform 48. Hence, the home AAA server 49 will forward the Access-Request message, after authentication, to the platform 48 that is performing the prepaid server (PPS) function (at S3). Assuming that the station 13 is that of a valid prepaid customer having a positive prepaid account balance, the PPS 48 will authenticate the station and return an Access-Accept message (at S4), and the AAA server 49 will forward that message to the PDSN 27 acting as the FA on this session (at S5).

Using the HA IP address, the PDSN/FA 27 next forwards the MIP RRQ request message to the appropriate HA node 47 (at S6). This message contains the assigned COA, but the field for the station's IP address contains the default value (represented by w.x.y.z in the drawing).

In response to the MIP RRQ message received at S6, the home agent 47 sends an Access Request message to the AAA server 49 (at S7); and the AAA server 49 acting as a proxy for the prepaid service forwards that message to the PPS server platform 48 (at S8). These Access Request messages include the NAI of the mobile station 13. In the subsequent Access-Accept message (at S9), the prepaid server 48 will specify an initial quota of prepaid resources as well as a resource usage threshold at which the prepaid client will provide notification and perform an accounting updating reflecting a portion of the prepaid account balance that has been consumed, based on the particular user's account information. The prepaid server 48 sends the Access-Accept message to the AAA server 49 (at S9), and the server 49 forwards the message to the home agent 47 (at S10).

Since the access attempt by the mobile station 13 has now been validated, at the home agent 47, the home agent 47 will now assign an IP address to that station for its use during the current session. At this point, the home agent also establishes a 'binding' for the mobile station 13 based on the assignment of the IP address and the correlation thereof to the COA type address assigned by the PDSN-FA 27 (see step S6). At step S11, the home agent (HA) 47 sends a mobile IP registration reply message (MIP RRP) to the foreign agent (FA) PDSN 27. At about the same time, the HA 47 starts accounting for session time.

The MIP RRP message includes the IP address that the home agent 47 assigned to the mobile station 13, for that station's use as its home IP address for this requested data session. The PDSN-FA forwards to the MIP RRP message at S12, signifying that the access request has been granted (responsive to the original request at S1) and to provide the mobile station with necessary information such as the assigned home IP address.

Upon receiving the MIP assigned home IP address (in the MIP RRP response message at S12), the mobile station 13 can send and receive IP packet data using the downloaded assigned address, in the normal manner used in a wireless packet data communication network. The MIP RRP message also includes a lifetime parameter set by the home agent 47. The lifetime sets a period requiring the mobile station 13 to initiate another registration procedure (similar to that of FIG. 2) to keep the IP address assignment alive. If the HA 47 does not receive a new registration request from the mobile station 13 before the lifetime expires, the HA 47 will release the binding effectively terminating the data session for the particular mobile station. A similar procedure is used to update the registration of the mobile station 13, as the station 13 roams across PDSN boundaries.

In the example, the PDSN-HA 47 acts as a prepaid client (PPC), although the client functions may be performed by the PDSN-FA 27. For example, the home agent PDSN 47 carries out quota replenishment after threshold expiry using online Access-Requests, which contain the amount of duration/volume used for that session. The PPC will release resources when the quota is not replenished and runs out. The node performing these PPC functions, in this example, the home agent PDSN 47, implements the duration based real-time rating functionality and thus implements the 'last user activity' policy. Start of measurement of duration of a MIP session substantially coincides with the time of IP address assignment at initial MIP binding (see S11 in FIG. 2); and the local policy ends the duration measurement at the last user activity of the particular session, where user activity includes MIP signaling with regard to the user's MIP session. Other types of activity, such as RADIUS signaling to/from the PPS platform 48 or HA activity in recognizing that the account has been exhausted, are not included.

Figure 3:
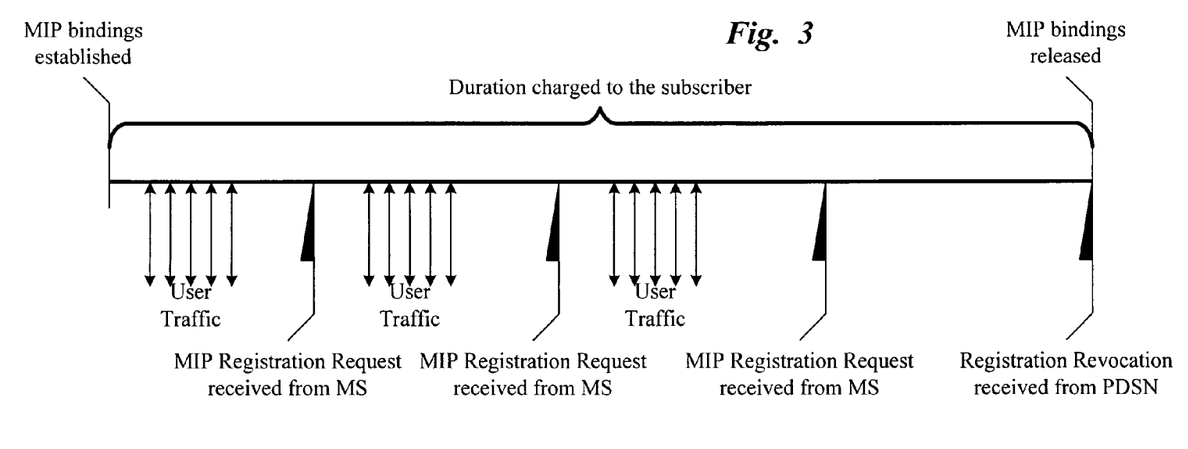
FIGS. 3 to 7 are timelines of examples of data communication sessions through the network of FIG. 1, useful in explaining calculation of session duration where the sessions are terminated by different events.

Timeline examples of how the HA applies this policy to specific events appear in FIGS. 3-7. Consider first the example of FIG. 3. As shown in FIG. 3, the charged duration begins when the home agent establishes the MIP binding for the user's data session. This point corresponds to step S11 in the signaling process of FIG. 2.

While the session continues, the mobile station 13 sends and/or receives packet data via the network 11 from time to time, as represented by the two-way arrows labeled user traffic. Because the home IP address assigned to the station is an address of the router in the PDSN 47, at least the data packets going to the mobile station pass through the node 47 and can be detected by the home agent functionality. Also, the mobile station sends a new MIP registration request from time to time, to prevent the lifetime set for the binding from expiring and thus to keep the MIP session alive. The home agent 47 receives these periodic MIP registration requests much like it received the MIP RRQ at S6 in the process depicted in FIG. 2. For purposes of measuring session duration for the prepaid accounting, both the user traffic and the MIP registration requests are considered to be forms of "user activity."

In this first example, the session terminates when the home agent receives a MIP registration revocation message from the PDSN 27 that is serving as the station's foreign agent (FA). The PDSN-FA 27, for example, may send such a revocation because the PPP session between the mobile station 13 and that PDSN ended, e.g. when the user logged-off. The network 20 may also terminate the session at the FA PDSN, under certain circumstances. The MIP signaling to terminate the data session, in this case, MIP registration revocation message from the FA PDSN 27, is considered to be the last user activity.

At the end of each session, the home agent 47 sends a final Access Request message to the AAA server 49, which the server 49 forwards to the PPS platform 48. This final message provides the accounting information, in this case the duration as defined by the 'last user activity' policy. The duration reflects the particular event that terminated the MIP session. In the example of FIG. 3, the duration extends to the time of receipt of the MIP registration revocation request at the home agent 47, and the final Access Request message will reflect that duration. The PPS 48 uses the duration information to update the account record associated with the mobile station 13.

Figure 4:
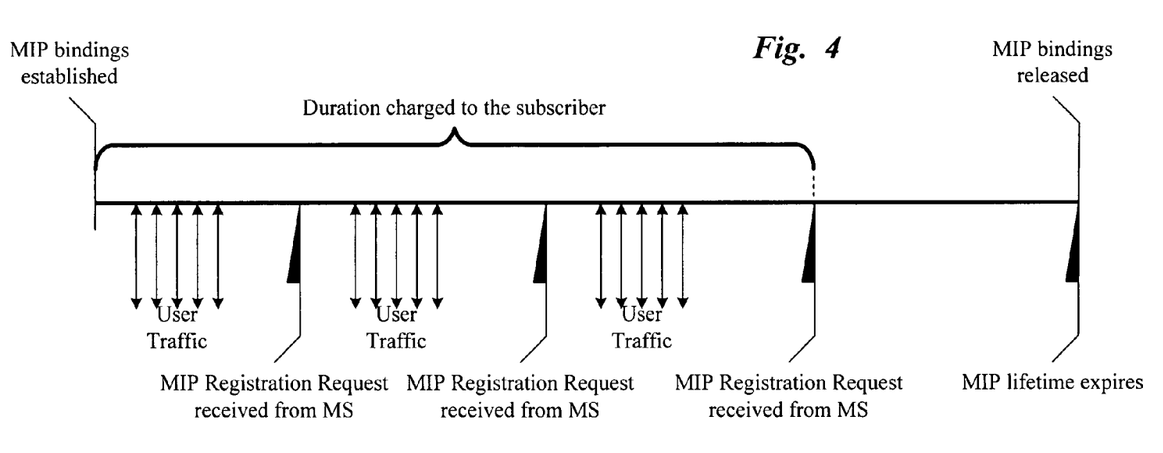

The examples represented by the timelines of FIGS. 4-7 are similar to that of FIG. 3, except that each example relates to a different type of termination event and thus a different end time for the measurement of the duration of the session. FIG. 4, for example, represents a session where the MIP lifetime expires, and the home agent 47 terminates the session due to that expiration event. In that case, the actual time of termination does not correspond to any user activity (neither user data traffic nor MIP signaling). The home agent therefore calculates the session duration from the initial MIP binding to the last detected user activity. The last detected user activity could be user data traffic, although in this example, the last detected user activity was the last MIP registration request received prior to the expiration of the MIP registration/binding. The home agent 47 sends its final Access Request message, for forwarding to the PPS 48, with information reflecting that the duration of usage ended at the time of the last MIP registration request received at the home agent 47.

Figure 5:
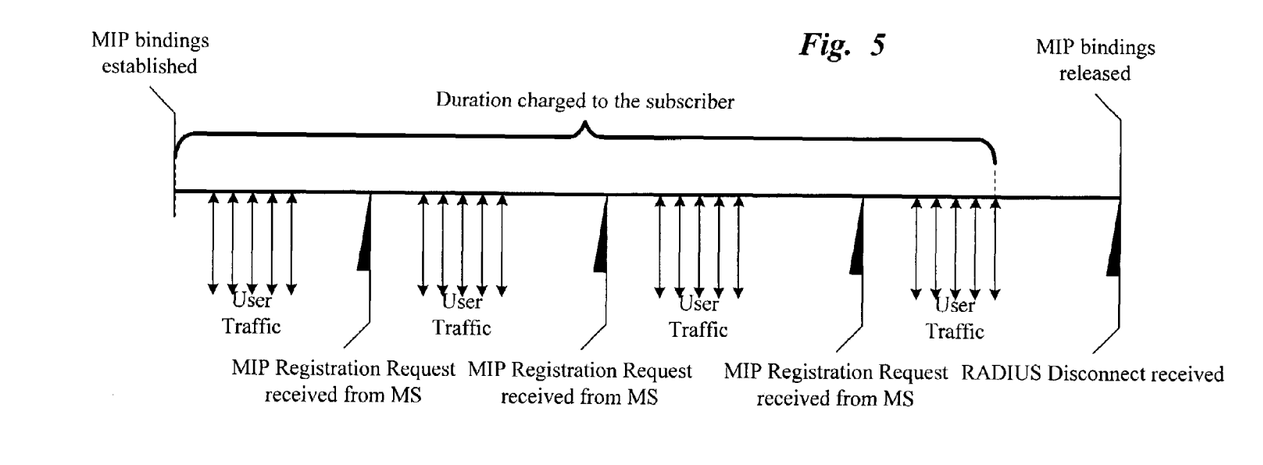

The home agent will also terminate a MIP session in response to a RADIUS Disconnect message, and FIG. 5 depicts a timeline relating to an example of a session terminated in that manner. The RADIUS Disconnect message may represent detection of an error. In the prepaid service application, the PPS server 48 uses this type of message to terminate an ongoing session when it detects certain conditions related to the prepaid account. As noted above, the home agent 47 will administer a quota received from the PPS 48. As he user consumes the allotted quota, the home agent 47 will request replenishment of the quota from the PPS 48. Hence, the PPS is expecting periodic online Access Request messages from the home agent. If these requests become irregular or are over due for some period, the PPS 48 may decide to terminate the session, in which case it sends a RADIUS Disconnect message to the home agent 47.

The RADIUS Disconnect message, however, is not MIP signaling. Hence, for purposes of the duration measurement, the home agent 47 will not consider the RADIUS Disconnect message as user activity. In this example, the actual time of termination does not correspond to any user activity (user data traffic or MIP signaling). The home agent 47 therefore calculates the session duration from the initial MIP binding to the last detected user activity. In this example, the last user activity detected was user data traffic. The home agent 47 sends its final Access Request message, for forwarding to the PPS 48, with information reflecting that the duration of usage ended at the time of the last user data traffic that passed through the PDSN 47 that is serving as the home agent node.

Figure 6:
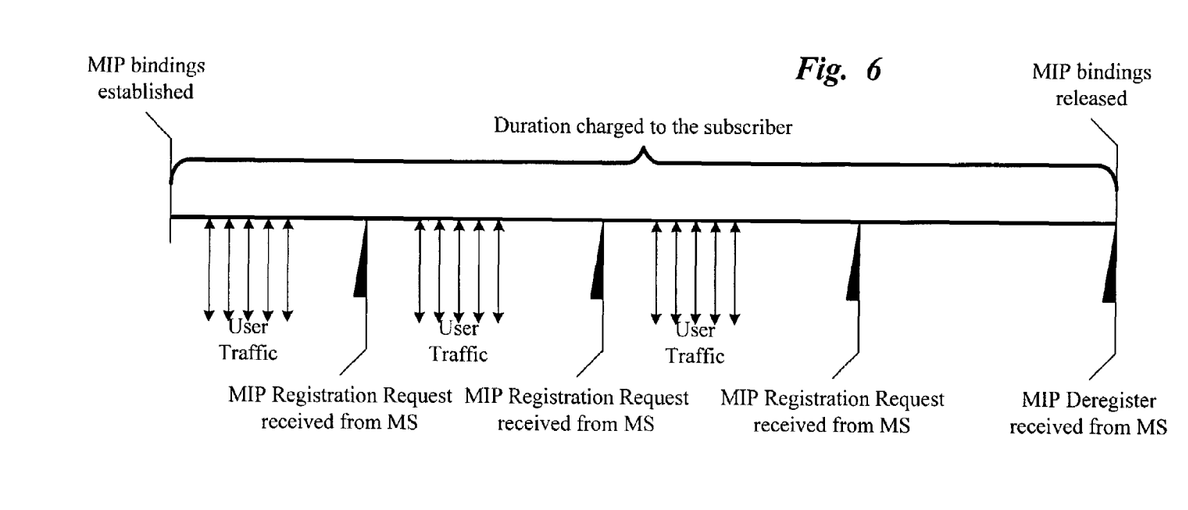

Although not commonly used today, the standard also provides that the mobile station may send a MIP deregistration message to terminate the MIP session, for example, in the form of a registration message specifying a lifetime value of zero. The home agent terminates the MIP session for the station 13 upon receipt of such a message. FIG. 6 shows a timeline for an example of a session terminated in that manner. Like the example of FIG. 3, the home agent 47 measures the session duration until the last MIP related signaling message is received, as such messages are considered "user activity." Hence, the duration extends up to the time of receipt of the MIP deregistration message.

Figure 7:
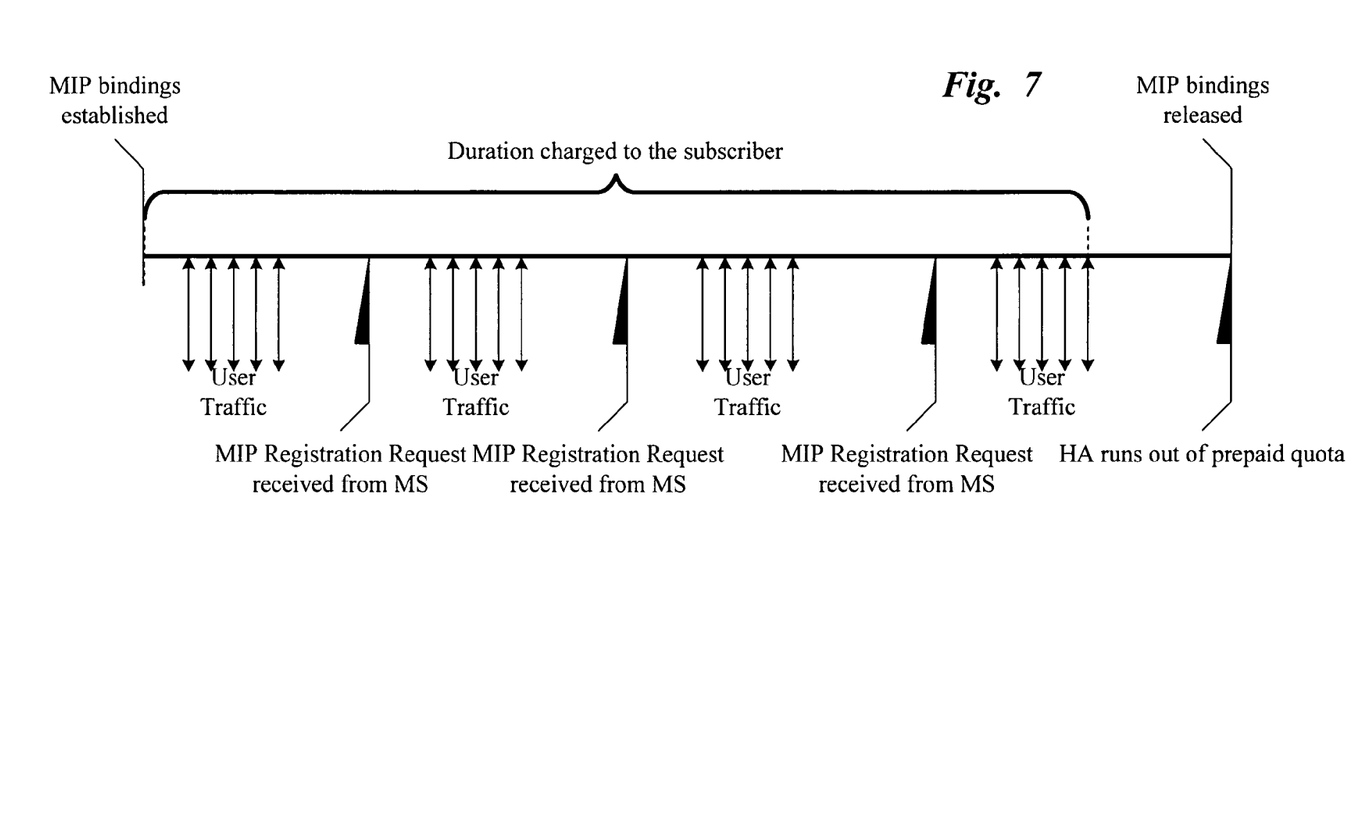

The PDSN home agent node 47 monitors usage and will terminate a MIP session if it detects that the quota has run out. Normally, the PPS 48 will replenish the quota (upon request from the home agent), but when the account has reached the prepaid limit, it will not further extend or replenish the quota. In such a case, the last quota will be exhausted, and the session ends when the home agent detects exhaustion of the quota. FIG. 7 shows a timeline for an example of a session terminated in that manner. Like the example of FIG. 4, the termination does not coincide with data traffic to/from the user or MIP signaling. Hence, the duration is measured up to the last user traffic, that is to say until the last detected communication of user data through the PDSN 47 serving as the home agent node, in this particular example.

As will be apparent from the above discussion, aspects of the accounting techniques are implemented by a PDSN 47 that serves as the home agent and as a prepaid client (PPC). The hardware platform of the PDSN is known and suitable equipment is already deployed in many advanced networks. The added functionality related to the measurement of duration running until last user activity on the MIP session may be implemented in such known or existing hardware, typically, via an upgrade of the programming or software of the appropriate PDSN. Those skilled in the art will understand that new versions of the PDSN or new equipment for providing the home agent and PPC functionality can include hardware or software to support the duration based accounting discussed herein.

Hence aspects of the techniques discussed in this case encompass network hardware and programmed equipment as well as software programming, for performing the relevant functions. A software or program product may take the form of code or executable instructions for causing a PDSN or other programmable equipment to perform the relevant steps, where the code or instructions are carried by or otherwise embodied in a medium readable by a computer or other machine. Instructions or code for implementing such operations may be in the form of computer instruction in any form (e.g. source code, object code, interpreted code, etc.) stored in or carried by any readable medium.

Terms relating to computer or machine "readable medium" for bearing programming refer to any medium that participates in providing code or instructions to a processor for execution. Such a medium may take many forms, including but not limited to, non-volatile media, volatile media, and transmission media. Non-volatile media include, for example, optical or magnetic disks, such as any of the storage devices in the elements of the network illustrated in FIG. 1. Volatile media include dynamic memory, such as main memory. Transmission media include coaxial cables; copper wire and fiber optics including the wires that comprise a bus within a computer system. Transmission media can also take the form of electric or electromagnetic signals, or acoustic or light waves such as those generated during radio frequency or infrared data communications. In addition to storing programming in network or system elements, various forms of computer readable media may be involved in carrying one or more sequences of one or more instructions to a processor for execution, for example, to install appropriate software in a PDSN or server in the network 11.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

Authentication, Authorization, and Accounting (AAA)
Base Station Controller (BSC)
Base Transceiver System (BTS)
Care-of-Address (COA)
Code Division Multiple Access (CDMA)
Corresponding Node (CN)
Evolution, Data Only (EVDO)
Foreign Agent (FA)
Global Service for Mobile (GSM)
General Packet Radio Service (GPRS)
Home Agent (HA)
Home Location Register (HLR)
Internet Protocol (IP)
Kilo-Bytes (KB)
Minutes of Use (MOU)
Mobile IP (MIP)
Mobile IP Registration Request message (MIP RRQ)
Mobile IP Registration Reply message (MIP RRP)
Mobile Node to AAA authentication key (MN-AAA)
Mobile Node to Home Agent authentication key (MN-HA).
Mobile Switching Center (MSC)
Mobile Telephone Switching Office (MTSO)
Network Access Identifier (NAI)
Packet Control Function (PCF)
Packet Data Serving Node (PDSN)
Point-to-Point Protocol (PPP)
Prepaid Client (PPC)
Prepaid Packet Data (PPD)
Prepaid Server (PPS)
Push-to-Talk (PTT)
Radio Access Network (RAN)
Remote Authentication Dial-User Service (RADIUS)
Service Control Point (SCP)
Short Message Service (SMS)
Simple IP (SIP)
Transmission Control Protocol (TCP)
Transmission Control Protocol/Internet Protocol (TCP/IP)
Universal Mobile Telephone Service (UMTS)
Visited Location Register (VLR)
Voice over IP (VoIP)
Wireless Local Area Network (WLAN)

What is claimed is:

1. A method of accounting for use of a packet data communication service provided to a mobile station via a wireless communication network, the method comprising:

in response to a request, for the packet data communication service for the mobile station, establishing a packet data communication session for the mobile station through the wireless communication network;

terminating the packet data communication session for the mobile station upon detecting one of a plurality of events, the plurality of events including receipt of at least one session related signaling message regarding termination and at least one network initiated termination; and measuring duration of usage by the mobile station for accounting purposes from the establishment of the session until last detected user activity, wherein user activity is defined as:

including packet data communications for the mobile station through the wireless communication network and the receipt of any session related signaling message, and excluding the at least one network initiated termination.

2. The method of claim 1, further comprising reducing a prepaid account balance purchased by a user of the mobile station, based on the measured duration.

3. A product comprising: executable instructions for causing a programmable network element to implement the method as recited in claim 1, and a machine readable medium bearing the instructions.

4. Equipment programmed for performing the steps of the method of claim 1.

5. The method of claim 1, wherein:
the session is a Mobile Internet Protocol (MIP) session;
the session is established upon MIP assignment of an Internet Protocol (IP) address for use by the mobile station during the session.

6. The method of claim 5, wherein the at least one session related signaling message regarding termination comprises any of a MIP signaling message relating to deregistration or revocation.

7. The method of claim 6, wherein the network initiated termination comprises any of: a termination upon failure of the mobile station to re-register within a set time interval, exhaustion of funds in a prepaid account as a result of usage by the mobile station and a receipt of a Remote Authentication Dial-User Service (RADIUS) disconnect message from a server managing the prepaid account.

8. The method of claim 6, wherein the measuring of duration is performed at a Packet Data Serving Node (PDSN) of the wireless communication network serving as a home agent for MIP address assignment and for routing of data to/from the mobile station.

9. A method of providing a prepaid packet data communication service to a mobile station via a wireless communication network, the method comprising:

receiving a mobile internet protocol (MIP) request message, relating to a request for the packet data communication service for use by the mobile station;

establishing a MIP packet data communication session for the mobile station through the wireless communication network, establishment of the MIP session including assigning an Internet Protocol (IP) address for use by the mobile station during the MIP session;

starting a measurement of duration of the session substantially upon the establishment of the MIP session;

routing packets of data containing the assigned IP address to or from the mobile station via the established MIP session;

terminating the MIP session for the mobile as a result of a network initiated termination;

responsive to the session being terminated as a result of the network initiated termination, using time of the later of: the last packet of data for the mobile station routed prior to termination, and a last MIP signaling message that did not result in termination of the MIP session received prior to termination, as an ending of the measured duration instead of time of the network initiated termination; and reporting the measured duration, to enable reducing of a prepaid account balance purchased for the mobile station, based on the measured duration.

10. The method of claim 9, wherein the network initiated termination comprises any of: a termination upon failure of the mobile station to re-register within a set time interval, exhaustion of funds in the prepaid account as a result of usage by the mobile station, and receipt of a Remote Authentication Dial-User Service (RADIUS) disconnect message.

11. A product comprising: executable instructions for causing a programmable network element to implement the method as recited in claim 9, and a machine readable medium bearing the instructions.

12. A packet data serving node programmed for performing the steps of the method of claim 9.

13. The method of claim 9, wherein the last MIP signaling message that did not result in termination of the MIP session comprises a MIP registration request message.

14. The method of claim 13, wherein the network initiated termination comprises any of: a termination upon failure of the mobile station to re-register within a set time interval, exhaustion of funds in the prepaid account as a result of usage by the mobile station, and receipt of a Remote Authentication Dial-User Service (RADIUS) disconnect message.

* * * * *